(12) United States Patent
Acharya

(10) Patent No.: US 6,901,050 B1
(45) Date of Patent: May 31, 2005

(54) SYSTEMS AND METHODS FOR FLOW-BASED TRAFFIC SHAPING

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 821 days.

(21) Appl. No.: 09/797,689

(22) Filed: Mar. 5, 2001

(51) Int. Cl.[7] ............................................. H04L 12/56
(52) U.S. Cl. ................. 370/230.1; 370/232; 370/235.1; 370/412
(58) Field of Search ................................ 370/229–238, 370/252, 412–418; 709/235

(56) References Cited

U.S. PATENT DOCUMENTS

| | | | | |
|---|---|---|---|---|
| 5,812,527 A | * | 9/1998 | Kline et al. ................. | 370/232 |
| 6,118,791 A | * | 9/2000 | Fichou et al. ................ | 370/468 |
| 6,147,970 A | * | 11/2000 | Troxel ......................... | 370/235 |
| 6,185,210 B1 | * | 2/2001 | Troxel .................... | 370/395.32 |
| 6,356,565 B1 | * | 3/2002 | Bouyer et al. .............. | 370/468 |
| 6,424,624 B1 | * | 7/2002 | Galand et al. .............. | 370/231 |
| 6,522,628 B1 | * | 2/2003 | Patel et al. .............. | 370/230.1 |
| 6,538,989 B1 | * | 3/2003 | Carter et al. ................. | 370/229 |
| 6,633,575 B1 | * | 10/2003 | Koodli ........................ | 370/412 |
| 6,690,647 B1 | * | 2/2004 | Tang et al. .................. | 370/235 |
| 6,700,876 B1 | * | 3/2004 | DiNicola et al. ........... | 370/252 |
| 6,829,649 B1 | * | 12/2004 | Shorey et al. ................. | 709/235 |
| 2002/0036984 A1 | * | 3/2002 | Chiussi et al. .............. | 370/232 |
| 2002/0097677 A1 | * | 7/2002 | Hoar et al. .................. | 370/230 |

* cited by examiner

*Primary Examiner*—Seema S. Rao
*Assistant Examiner*—Robert C. Scheibel, Jr.
(74) *Attorney, Agent, or Firm*—Harrity & Snyder LLP

(57) ABSTRACT

A system controls transmission of packet flows in a network device on a per-flow basis. The system includes multiple token buckets corresponding to the output ports of the network device, multiple bucket counters associated with the token buckets, and control logic. The token buckets store one or more tokens. Each of the tokens corresponds to a portion of one or more received packet flows to be transmitted by the network device. The bucket counters have one or more programmable counting properties and generate token increment signals for storing tokens in corresponding ones of the token buckets. The control logic monitors the packet flows being sent through the network device and controls the programmable counting properties of the bucket counters based on the monitored packet flows.

20 Claims, 7 Drawing Sheets

SYSTEMS AND METHODS FOR FLOW-BASED TRAFFIC SHAPING

TECHNICAL FIELD

The present invention relates generally to communication systems and methods and, more particularly, to systems and methods for flow-based traffic shaping.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

A common problem in conventional network switches is how to control the traffic (e.g., the volume or rate of packets) transmitted from the switches. Traffic may be controlled to obtain some quality of service goal, such as minimizing packet loss or congestion. Some switches may use traffic shaping techniques to control traffic. "Traffic shaping" is forcing the traffic to conform to a certain specified behavior. For example, a switch might delay some packets slightly in order to reduce the peak rate and rate variance without affecting throughput.

Conventional traffic shaping techniques, however, do not permit the traffic to be controlled or fine tuned for each flow (packet stream) through a network switch.

DISCLOSURE OF THE INVENTION

There exists a need for systems and methods that provide flow-based traffic shaping on a per output port basis. The systems and methods provide a token bucket mechanism that controls the traffic transmitted by a network switch. This and other needs are met by the present invention, where the packet rate or volume of packets through the network switch may be controlled, thereby facilitating quality of service controls.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a system that controls transmission of packet flows in a network device on a per-flow basis. The system includes multiple token buckets corresponding to the output ports of the network device, multiple bucket counters corresponding to the token buckets, and control logic. The token buckets store one or more tokens. Each of the tokens corresponds to a portion of one or more received packet flows to be transmitted by the network device. The bucket counters have one or more programmable counting properties and generate token increment signals for causing corresponding ones of the token buckets to store tokens. The control logic monitors the packet flows transmitted by the network device and controls the one or more programmable counting properties of the bucket counters based on the monitored packet flows.

In another implementation consistent with the present invention, a method controls traffic in a network device on a per-flow basis. The method includes monitoring packet flows through the network device; generating a flow-count signal based on one of the packet flows; comparing the flow-count signal to a threshold; using a result of the comparison to identify one of multiple control signals; and programming one or more programmable properties based on the control signals. The programmable properties relate to the transmission of the packet flow by the network device.

In a further implementation consistent with the present invention, a multiport network device includes a receiver, a transmitter, token bucket logic, and control logic. The receiver is configured to receive a plurality of packet flows. The transmitter includes a plurality of output ports configured to transmit some or all of the received packet flows.

The token bucket logic is configured to control the transmission of the packet flows by the multiport network device. The token bucket logic includes a plurality of token buckets and token bucket control logic. The token buckets correspond to the output ports and are configured to store one or more tokens. Each of the tokens corresponds to a portion of one or more of the packet flows to be transmitted by one or more of the output ports.

The token bucket control logic is configured to generate the tokens for the token buckets. The token bucket control logic includes a master counter and a plurality of bucket counters. The master counter is configured to count to a first count value and generate a done signal when the count reaches the first count value. The bucket counters correspond to the token buckets and have one or more programmable counting properties. The bucket counters are configured to receive the done signal, begin counting to a second count value in response to the done signal, and generate a token increment signal for storing a token in the corresponding token buckets when the count reaches the second count value. The control logic is configured to monitor the packet flows transmitted by the multiport network device and control the one or more programmable counting properties of the bucket counters based on the monitored packet flows.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as to restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
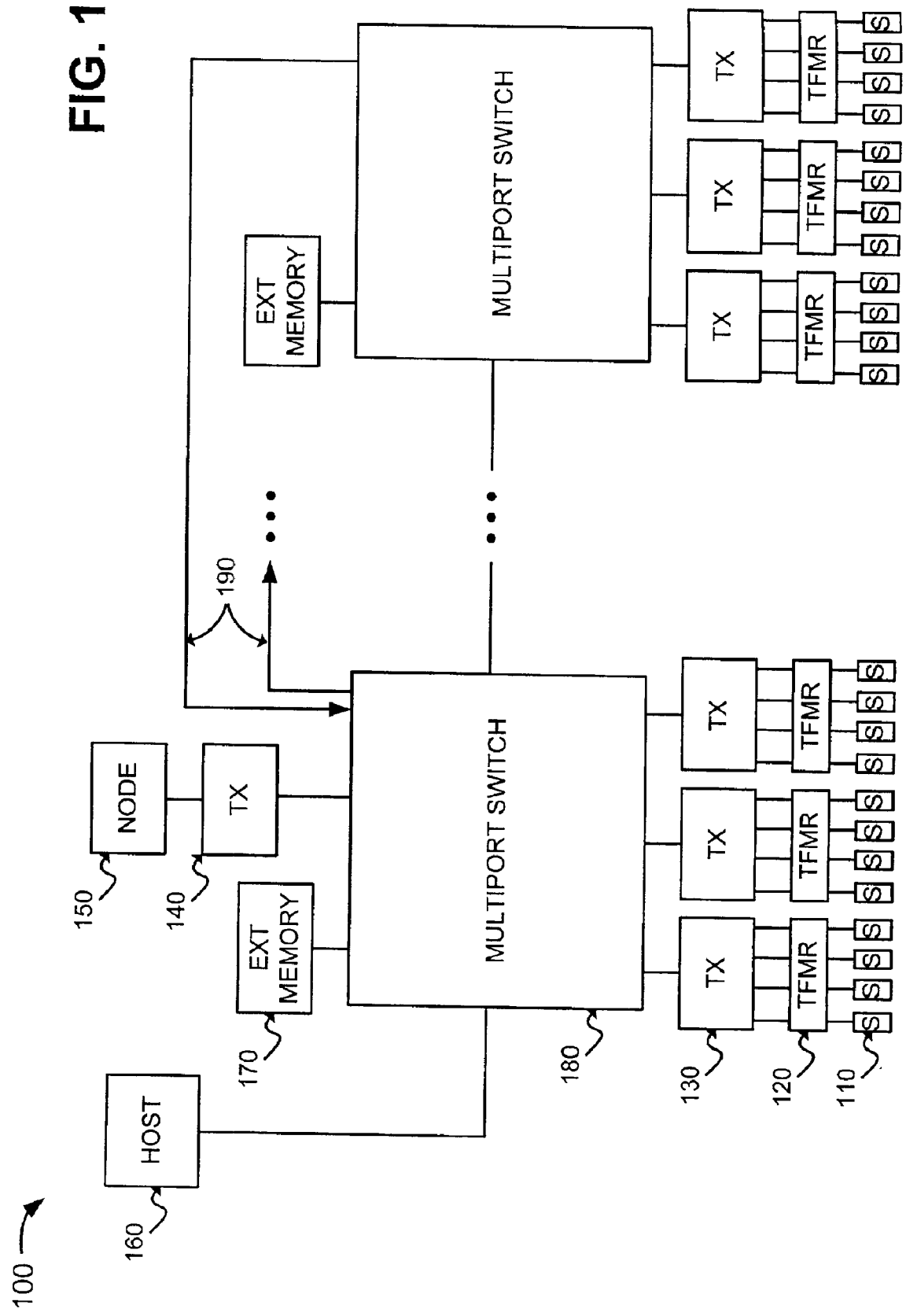
FIG. 1 is a block diagram of an exemplary system in which systems and methods consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex. Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
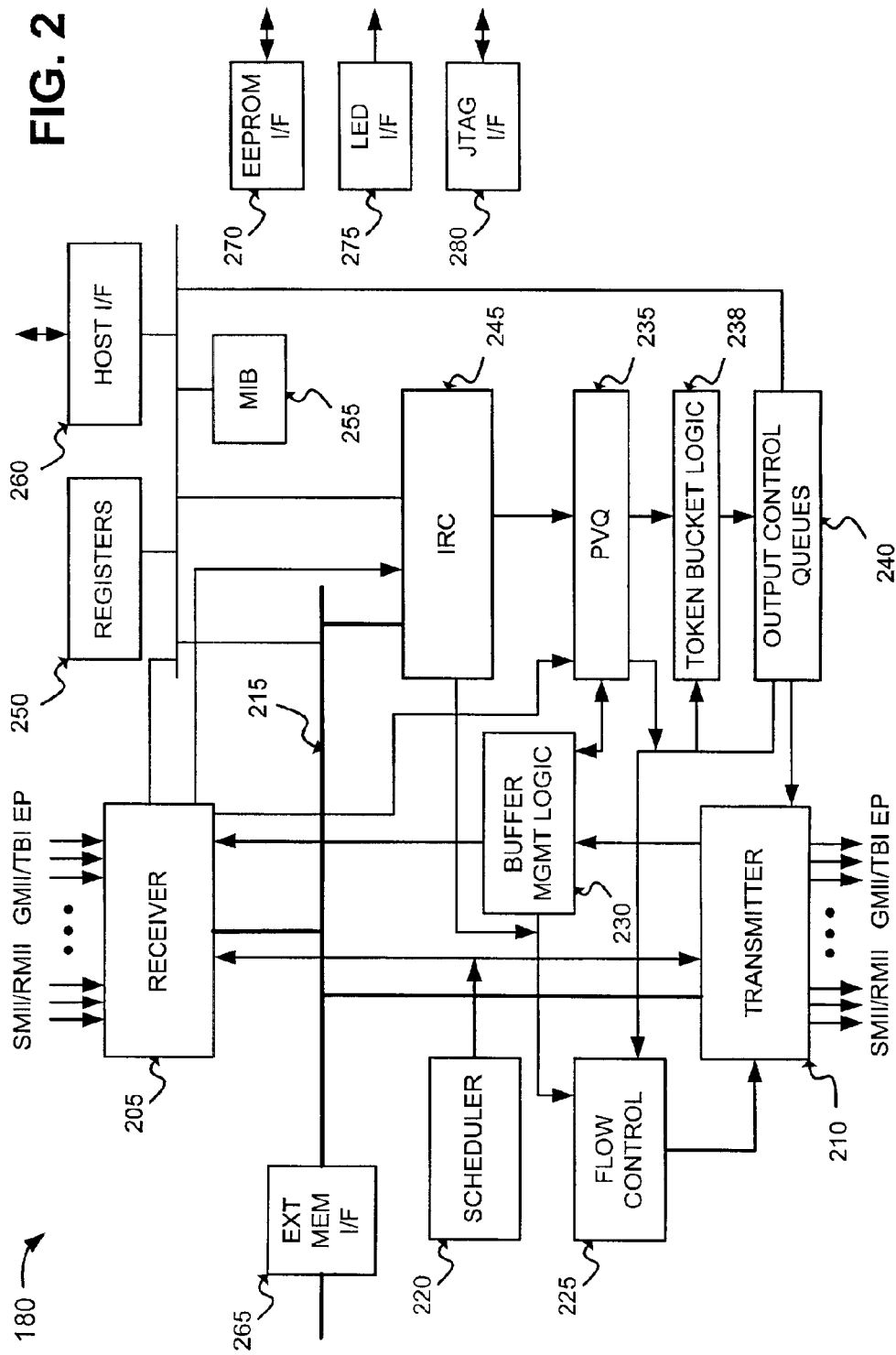
FIG. 2 is a detailed diagram of a multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, token bucket logic 238, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue.

The token bucket logic 238 may include logic that performs per-flow traffic shaping for each priority queue and output port. As described in more detail below, the token bucket logic 238 controls the acceptance of frame pointers, corresponding to received data frames, by the output queues of the output control queues 240.

The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Exemplary Token Bucket Logic

The present invention is directed to logic that permits the traffic through the switch 180 to be controlled on a per flow, per priority level, and per output port basis, thereby increasing the efficiency of the switch 180 and facilitating quality of service controls.

Figure 3:
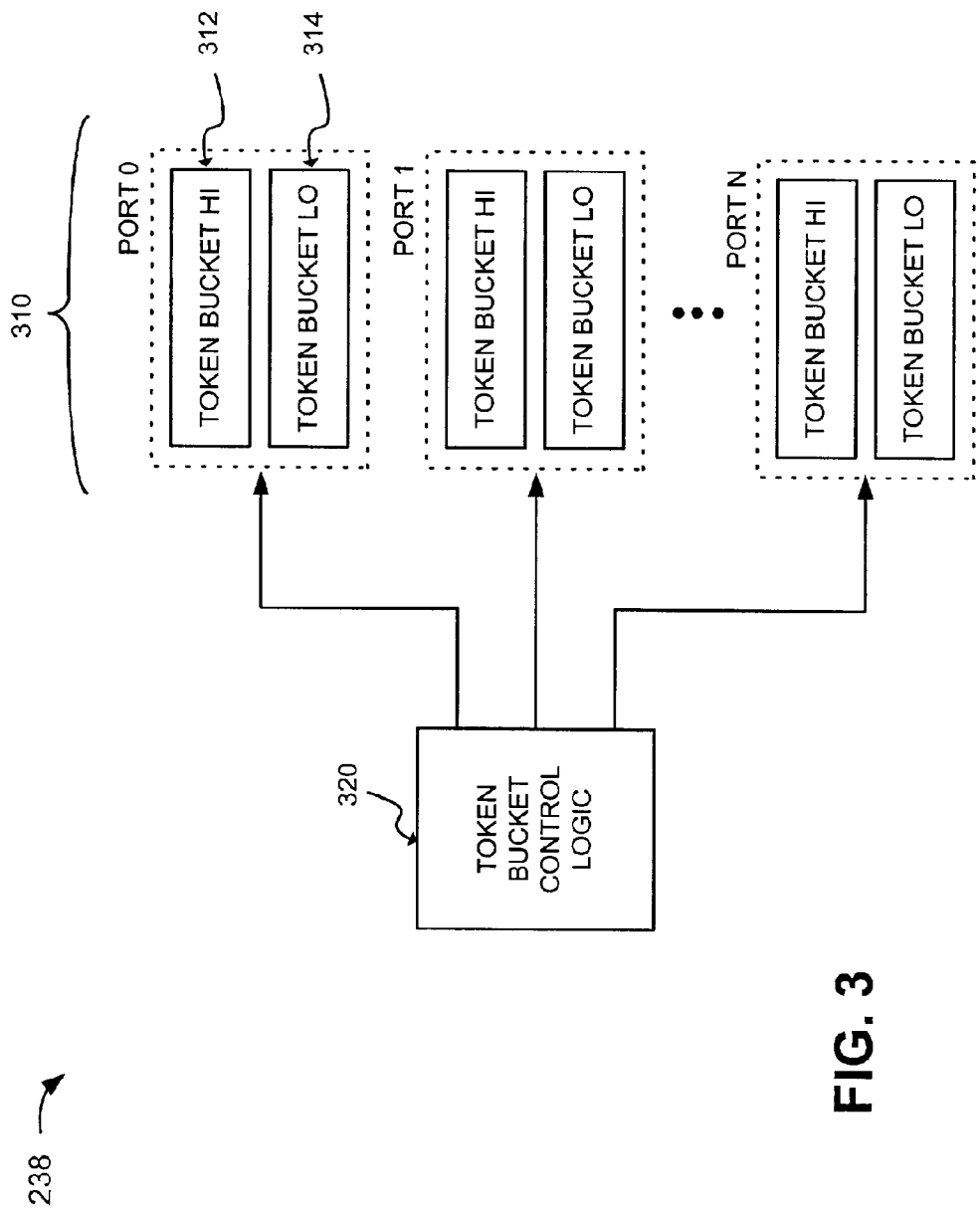
FIG. 3 is a diagram of the token bucket logic of FIG. 2 according to an implementation consistent with the present invention.

FIG. 3 is a diagram of the token bucket logic 238 according to an implementation consistent with the present invention. The token bucket logic 238 may include multiple token buckets 310 and token bucket control logic 320. The token buckets 310 may store tokens that correspond to bytes of packet data (i.e., data frames) received by the switch 180 to be transmitted from the output ports. When a token bucket 310 stores a sufficient number of tokens, the corresponding output queue may accept a frame pointer corresponding to a data frame that awaits transmission by the switch 180. If the token bucket 310 stores an insufficient number of tokens, the data frame may be downgraded to a lower priority level or discarded.

The token buckets 310 may be associated with the high and low priority output queues of the output control queues 240. For example, the token buckets 310 may include high priority token buckets 312 and low priority token buckets 314. In alternative implementations consistent with the present invention, the number of priorities and, hence, the number of associated priority token buckets, may be greater than two.

Figure 4:
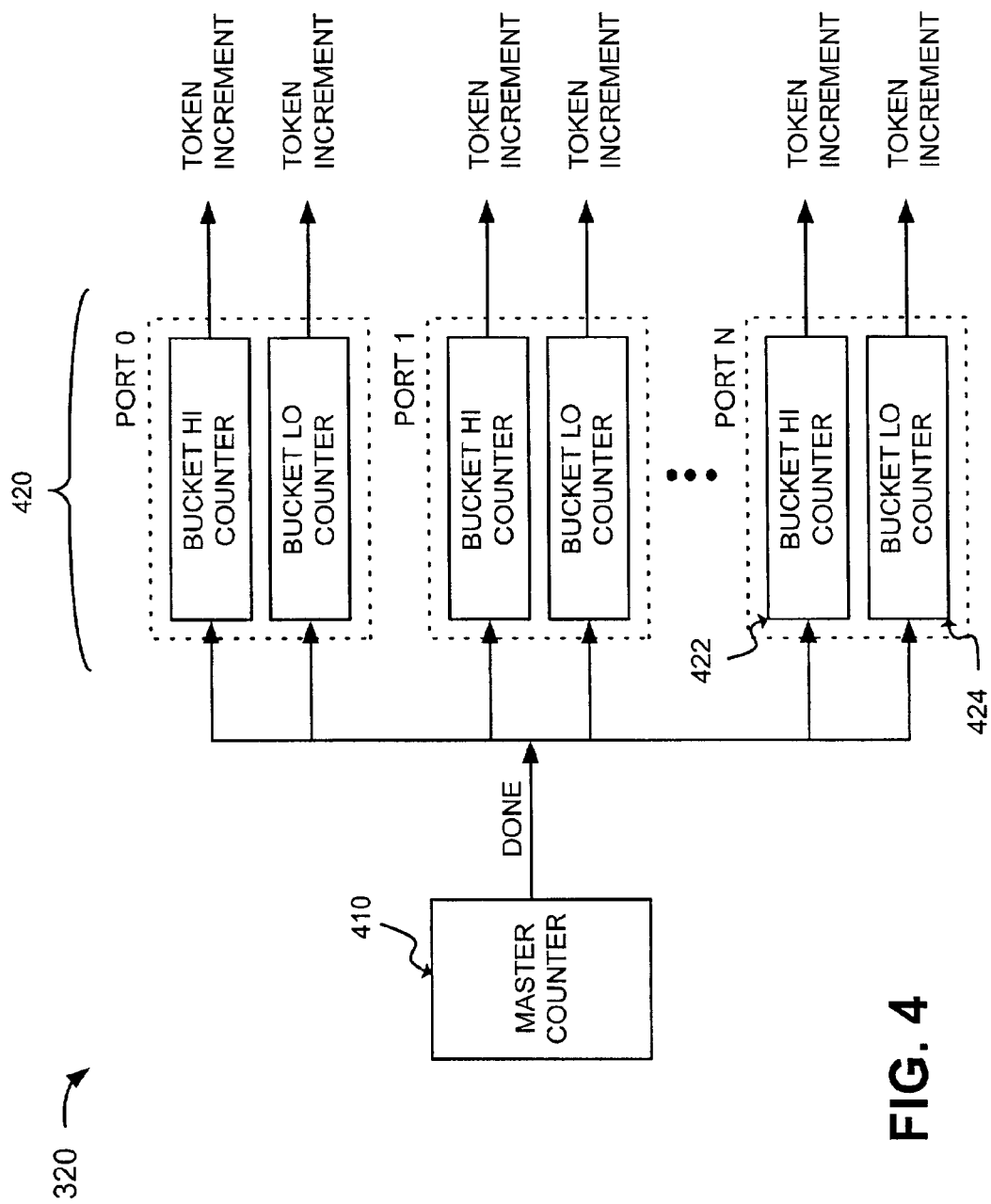
FIG. 4 is a diagram of the token bucket control logic of FIG. 3 according to an implementation consistent with the present invention.

The token bucket control logic 320 may store tokens in the token buckets 310. FIG. 4 is a diagram of the token bucket control logic 320 according to an implementation consistent with the present invention. The token bucket control logic 320 may include a master counter 410 and multiple bucket counters 420. The master counter 410 may be programmable (e.g., count rate and/or maximum count value) and possibly turned off via software. The master counter 410 may include programmable counting logic, such as a counter or a clock generator, that acts as a master clock. The master counter 410 may increment to a programmable maximum count (max cnt) value and output a done signal that serves to increment the count value in the bucket counters 420. The master counter 410 may then reset the count value and resume counting.

The bucket counters 420 may include programmable counting logic, such as counters or clock generators, that control the storage of tokens by the token buckets 310. Each of the bucket counters 420 may be associated with a token bucket 310. For example, the bucket counters 420 may include high priority bucket counters 422 and low priority bucket counters 424. In alternative implementations consistent with the present invention, the number of priorities and, hence, the number of associated priority bucket counters, may be greater than two.

The counting properties (e.g., count rate and/or maximum count value) of the bucket counters 420 may be programmed via control logic on a per-flow basis, as will be described later. The bucket counters 420 may increment to programmable maximum count (max cnt2) values in response to the done pulses from the master counter 410. Each of the bucket counters 422 and 424 may have a different programmable maximum count value. When the bucket counters 420 reach the maximum count values, they output a token increment signal to the token buckets 310. The token increment signal causes the corresponding token bucket 310 to store an additional token.

Using the above components, the token bucket logic 238 may control the acceptance of frame pointers by the corresponding output queues based on the number of tokens stored in the token buckets 310. For example, an output queue may be controlled to accept a frame pointer under the following conditions: (1) when the byte count of a received packet is less than or equal to the number of tokens in the corresponding token bucket 310; or (2) when the byte count of the received packet is less than or equal to the number of tokens in the corresponding token bucket 310 plus 1 and the token bucket 310 has received a token increment signal from the corresponding bucket counter 420. Otherwise, the priority level of the received packet may be downgraded to a lower priority level or the received packet may be discarded.

Figure 5:
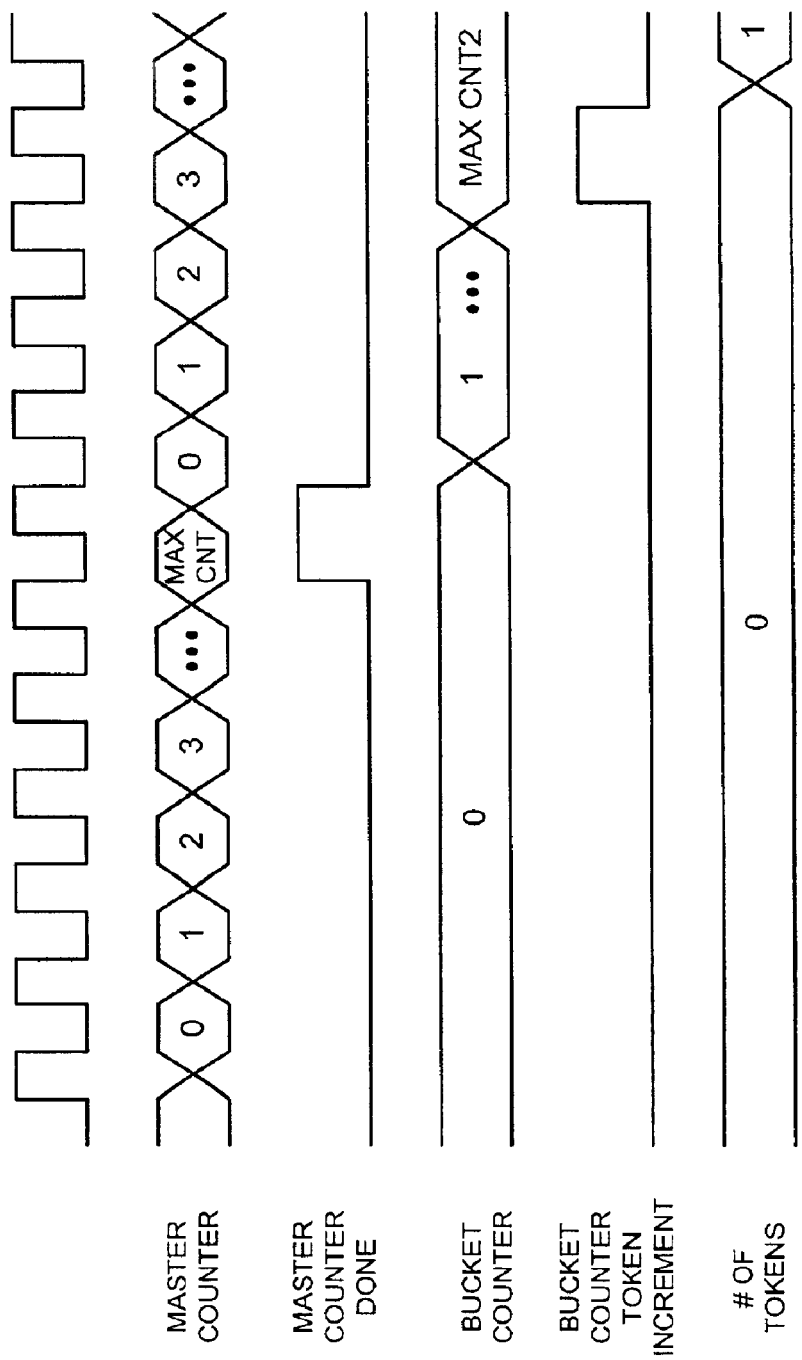
FIG. 5 is an exemplary timing diagram of the operation of the token bucket control logic of FIG. 4.

FIG. 5 is an exemplary timing diagram of the operation of the token bucket control logic 320. As shown in FIG. 5, the master counter 410 increments to a programmable maximum count (max cnt) value. When the master counter 410 reaches the maximum count value, the master counter 410 outputs a done signal to each of the bucket counters 420. The done signal causes the bucket counters 420 to begin incrementing. Each of the bucket counters 420 increments to a programmable maximum count (max cnt2) value. The maximum count value may differ for each of the bucket counters 420. When a bucket counter 420 reaches the maximum count value, the bucket counter 420 outputs a token increment signal that causes a token to be added to the corresponding token bucket 310.

In some implementations consistent with the present invention, the bucket counters 420 automatically reset upon reaching the maximum count (max cnt2) value. In this case, the bucket counters 420 may increment to the maximum count value multiple times prior to receiving each of the done signals from the master counter 410. As a result, the bucket counters 420 may output multiple token increment signals for each done signal from the master counter 410.

Exemplary Control Logic

Figure 6:
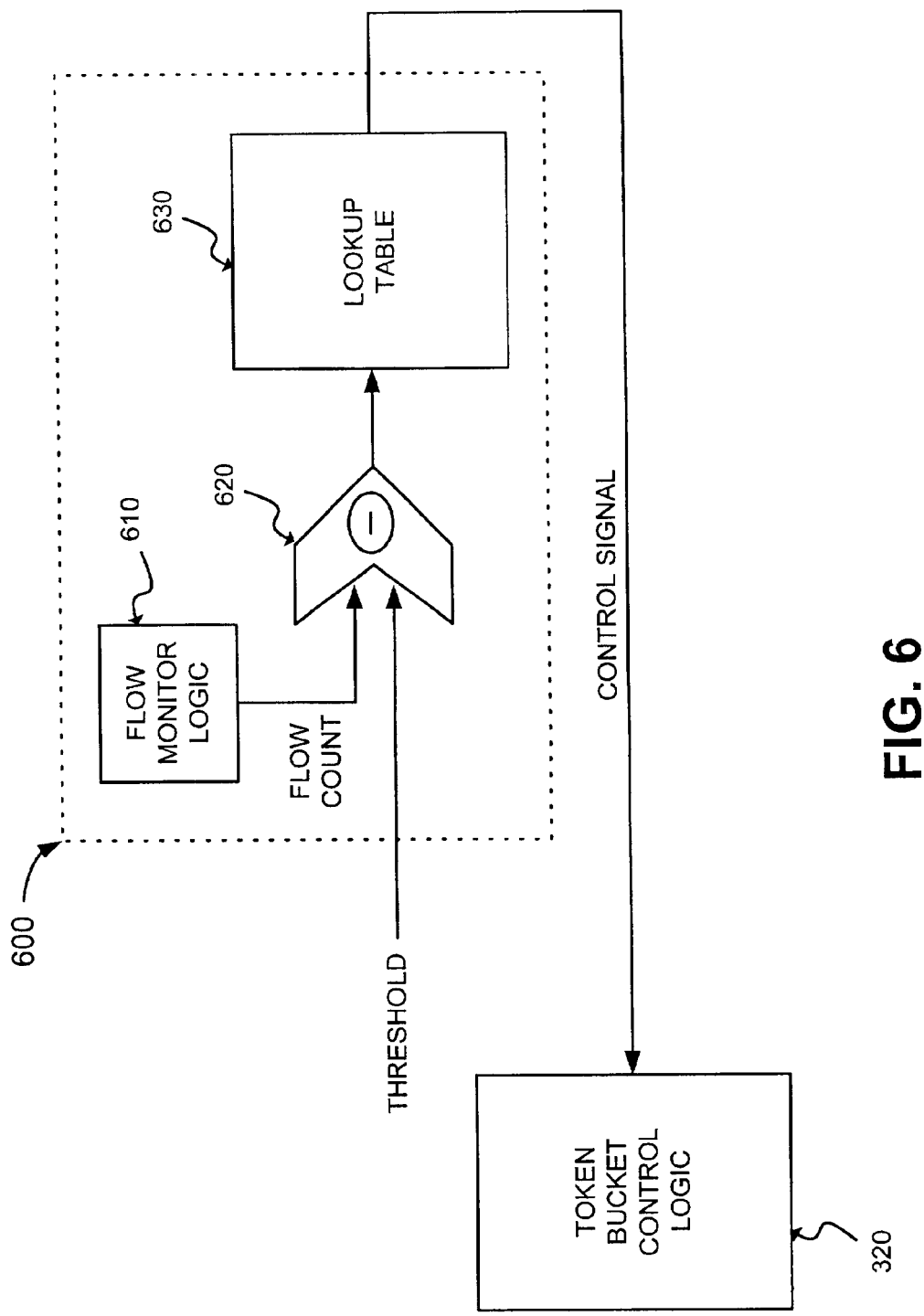
FIG. 6 is an exemplary diagram of control logic for controlling the counting properties of the bucket counters of FIG. 4.

FIG. 6 is an exemplary diagram of control logic 600 for programming the counting properties of the bucket counters 420 according to an implementation consistent with the present invention. In one implementation consistent with the present invention, the flow control logic 225 may contain one or more components of the control logic 600.

As shown in FIG. 6, the control logic 600 may include flow monitoring logic 610, a subtractor 620, and a lookup table 630. The flow monitoring logic 610 may monitor the packet flows (i.e., a series of packets or data frames belonging to a certain host and destination pair or belonging to a certain transport session between any two hosts) transmitted for each output port and priority level. Based on this information, the flow monitoring logic 610 may generate a flow-count signal that identifies the number of bytes transmitted for a particular flow.

The subtractor 620 may include a conventional subtracting mechanism. The subtractor 620 may operate upon two signals, such as the flow-count signal and a threshold signal. The threshold signal may correspond to a programmable threshold that varies per flow and per bucket counter 420. The subtractor 620 may determine the difference between the value of the flow-count signal and the threshold value to generate an address into the lookup table 630. The lookup table 630 may include multiple addressable entries that contain control signals for controlling one or more counting properties of the bucket counters 420, such as the count rate or maximum count value. The bucket counters 420 may be programmed based on the control signals to shape the traffic on the corresponding output port on a per-flow basis.

Exemplary Processing

Figure 7:
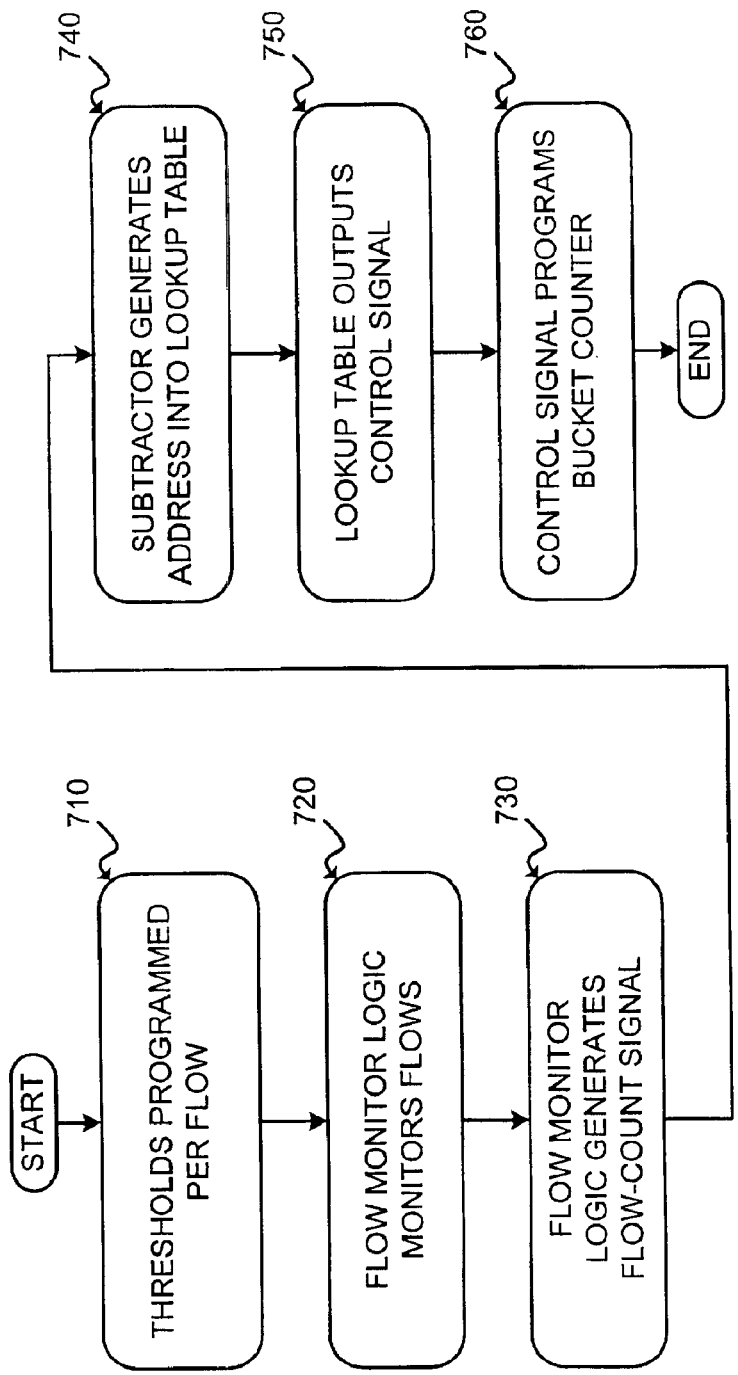
FIG. 7 is a flowchart of exemplary processing for shaping traffic of the multiport switch of FIG. 2 according to an implementation consistent with the present invention.

FIG. 7 is a flowchart of exemplary processing for shaping traffic of the multiport switch 180 according to an implementation consistent with the present invention. Processing may begin with the thresholds being programmed for each of the packet flows[act 710]. The thresholds may be programmed, for example, by the host 160 via the host interface 260 or by other mechanisms. The thresholds may vary among the flows and, at different times, may vary for the same flow.

The flow monitoring logic 610 may monitor the flows on each of the output ports and/or each of the priority queues for the output ports [act 720]. Alternatively, the flow monitoring logic 610 may monitor the flows on one or more select output ports. The flow monitoring logic 610 may, for example, track the number of bytes of packet data output from the particular output ports and/or priority queues. From this information, the flow monitoring logic 610 may generate a flow-count signal [act 730].

The flow monitoring logic 610 may provide the flow-count signal to the subtractor 620. The subtractor 620 may determine the difference between the value of the flow-count signal and the threshold value programmed for this particular flow to generate an address into the lookup table 630 [act 740]. The subtractor 620 may use the address to access a particular entry in the lookup table 630. The lookup table 630 outputs the control signal stored at the entry accessed by the subtractor 620 [act 750].

The token bucket control logic 320 may use the control signal to program counting properties of one or more of the bucket counters 420 [act 760]. For example, the token bucket control logic 320 may program the count rate or maximum count value of the bucket counter(s) 420. As a result, the traffic may be shaped on the corresponding output port on a per-flow basis.

Described has been systems and methods for shaping traffic in the multiport switch 180 on a per-flow basis. Advantages of the present invention include maximizing the efficiency of the multiport switch 180 and facilitating quality of service controls.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with regard to FIG. 7, the order of the acts may differ in other implementations consistent with the present invention.

Also, the control logic 600 has been described as containing a subtractor 620 that subtracts the flow-count value from the threshold value. In other implementations consistent with the present invention, other types of logic devices may be used, such as an adder, to generate the address into the lookup table 630.

What is claimed is:

1. A system for controlling transmission of packet flows in a network device on a per-flow basis, comprising:
    a plurality of token buckets corresponding to a plurality of output ports of the network device and configured to store one or more tokens, each of the tokens corresponding to a portion of one or more received packet flows to be transmitted by the network device;
    a plurality of bucket counters corresponding to the token buckets and having one or more programmable counting properties, the bucket counters configured to generate token increment signals for causing corresponding ones of the token buckets to store tokens; and
    control logic configured to:
        monitor the packet flows being sent through the network device,
        generate, for at least some of the packet flows, a respective address into a lookup table based on a comparison of an amount of traffic for a respective packet flow and a threshold value for the respective packet flow, the respective address being used to obtain information from the lookup table for controlling one or more programmable counting properties of a corresponding one of the bucket counters.

2. The system of claim 1, wherein the control logic includes:
    flow monitoring logic configured to generate a flow-count value based on a number of bytes of packet data sent out on a particular one of the packet flows.

3. The system of claim 2, wherein the control logic includes:
    a subtractor configured to determine a difference between the flow-count value of a particular one of the packet flows and the threshold value of the particular one of the packet flows, the threshold value being a programmable value.

4. The system of claim 3, wherein the threshold value varies among the packet flows.

5. The system of claim 1, wherein:
    the lookup table is configured to store a plurality of control signals for controlling the one or more programmable counting properties of the bucket counters.

6. The system of claim 3, wherein:
    the lookup table is configured to store a plurality of control signals for controlling the one or more programmable counting properties of the bucket counters, and
    the subtractor is further configured to generate the address into the lookup table based on the difference between the flow-count value and the threshold value and use the address to identify one of the control signals in the lookup table.

7. The system of claim 5, wherein the bucket counters are configured to use the control signals to program the one or more programmable counting properties.

8. The system of claim 1, wherein the one or more programmable counting properties include at least one of a count rate or a maximum count value.

9. The system of claim 1, wherein the one or more programmable counting properties vary among the bucket counters.

10. The system of claim 1, further comprising:
a master counter configured to increment to a first count value and generate a done signal when the incrementing reaches the first count value, the bucket counters being responsive to the done signal to commence incrementing to a second count value and generate the token increment signal when the incrementing by the bucket counters reaches the second count value.

11. A method for controlling traffic in a network device on a per-flow basis, comprising:
monitoring at least one of a plurality of packet flows through the network device;
generating a flow-count signal based on the packet flow;
comparing the flow-count signal to a threshold;
using a result of the comparison to generate an address into a lookup table to identify one of a plurality of control signals included at the address in the lookup table; and
programming one or more programmable properties based on the one of the control signals, the one or more programmable properties relating to transmission of the packet flow by the network device.

12. The method of claim 11, wherein the monitoring includes:
identifying a number of bytes of packet data sent out on the packet flow.

13. The method of claim 11, wherein the comparing includes:
determining a difference between the flow-count signal and the threshold, the threshold being a programmable value corresponding to the packet flow.

14. The method of claim 13, wherein the threshold varies among the packet flows.

15. The method of claim 13, wherein the using a result of the comparison includes:
generating the address into the lookup table based on the difference between the flow-count signal and the threshold.

16. The method of claim 11, wherein the network device includes a plurality of bucket counters, the one or more programmable properties including at least one of a count rate or a maximum count value of the bucket counters.

17. The method of claim 16, wherein the one or more programmable properties vary among the bucket counters.

18. A multiport network device, comprising:
a receiver configured to receive a plurality of packet flows;
a transmitter configured to transmit at least some of the received packet flows, the transmitter including a plurality of output ports;
token bucket logic configured to control the transmission of the packet flows by the multiport network device, the token bucket logic including:
a plurality of token buckets corresponding to the output ports and configured to store one or more tokens, each of the tokens corresponding to a portion of one or more of the packet flows to be transmitted by one or more of the output ports, and
token bucket control logic configured to generate the tokens for the token buckets, the token bucket control logic including:
a master counter configured to increment to a first count value and generate a done signal when the count reaches the first count value, and
a plurality of bucket counters corresponding to the token buckets and having one or more programmable counting properties, the bucket counters being configured to receive the done signal, begin incrementing to a second count value in response to the done signal, and generate a token increment signal for storing a token in the corresponding token buckets when the incrementing reaches the second count value; and
control logic configured to monitor the packet flows transmitted by the multiport network device and control the one or more programmable counting properties of the bucket counters based on the monitored packet flows.

19. The multiport network device of claim 18, wherein the control logic includes:
flow monitoring logic configured to generate a flow-count value based on a number of bytes of packet data sent out on a particular one of the packet flows,
a lookup table configured to store a plurality of control signals for controlling the one or more programmable counting properties of the bucket counters, and
a logic device configured to determine a difference between the flow-count value and a predetermined threshold value and use the determined difference to identify one of the control signals in the lookup table.

20. The multiport network device of claim 18, wherein the one or more programmable counting properties include at least one of a count rate or a maximum count value of the bucket counters.

* * * * *